(12) United States Patent
Kaiser

(10) Patent No.: US 6,594,285 B1
(45) Date of Patent: Jul. 15, 2003

(54) INTELLIGENT NETWORK SERVICE PROVISIONING SYSTEM

(75) Inventor: Bernhard Kaiser, Vaihingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/340,674

(22) Filed: Jun. 29, 1999

(30) Foreign Application Priority Data

Jun. 30, 1998 (DE) .......................... 198 29 026

(51) Int. Cl.⁷ .......................... H04L 12/16; H04M 3/42
(52) U.S. Cl. ................................ 370/522; 379/15.03
(58) Field of Search .................... 379/15.01, 15.03, 379/201.01, 201.05, 201.03, 201.12; 370/351, 254, 352, 401, 522

(56) References Cited

U.S. PATENT DOCUMENTS

| | | | |
|---|---|---|---|
| 5,590,171 A | * 12/1996 | Howe et al. | 379/2 |
| 5,701,301 A | * 12/1997 | Weisser, Jr. | 370/428 |
| 5,732,131 A | * 3/1998 | Nimmagadda et al. | 379/221.02 |
| 5,748,717 A | * 5/1998 | Chan et al. | 379/114.02 |
| 5,815,561 A | * 9/1998 | Nguyen et al. | 379/114.2 |
| 5,923,744 A | * 7/1999 | Cheng | 379/221.09 |
| 6,018,574 A | * 1/2000 | Malik | 379/207.02 |
| 6,085,194 A | * 7/2000 | Ige et al. | 707/1 |
| 6,169,794 B1 | * 1/2001 | Oshimi et al. | 379/201.01 |
| 6,181,787 B1 | * 1/2001 | Malik | 379/207.11 |
| 6,188,757 B1 | * 2/2001 | Malik | 379/207.02 |
| 6,295,351 B1 | * 9/2001 | Malik et al. | 379/207.02 |
| 6,330,598 B1 | * 12/2001 | Beckwith et al. | 709/223 |

FOREIGN PATENT DOCUMENTS

| | | | |
|---|---|---|---|
| DE | 44 41753 A1 | * 6/1995 | H04L/12/00 |
| DE | 19626131 A1 | * 1/1998 | H04M/3/42 |

OTHER PUBLICATIONS

"Intelligent Network" Nachrichtentechnik, Elekrnik Berlin 20, 1990. pp. 162–164.*

* cited by examiner

*Primary Examiner*—Melvin Marcelo
*Assistant Examiner*—Derrick W Ferris
(74) *Attorney, Agent, or Firm*—Sughrue Mion, PLLC

(57) ABSTRACT

A procedure for providing a telecommunication service. The service provisioning system (SDS) is equipped with a global service control point (GSCP1, GSCP2) and several service switching points (SSP1 to SSP3). Subscribers (A) of the telecommunication network (T_NET) send service request messages to service control functions, which control the implementation of the respective telecommunication service. The service provisioning system is also equipped with one or several local service control points (LSCP1 to LSCP4), whereby each of them is assigned to one of the service switching points (SSP1 to SSP3) and is connected via a local communication mechanism (L_NET1 to L_NET3). Depending on the telecommunication service being controlled, the service control function is installed globally or locally. The service switching point (SSP1 to SSP3) establishes whether the assigned service control function is currently installed locally or globally, and transfers the service request message accordingly.

11 Claims, 3 Drawing Sheets

INTELLIGENT NETWORK SERVICE PROVISIONING SYSTEM

BACKGROUND OF THE INVENTION

The present invention relates to the field of a service provisioning system for a telecommunication network, a service switching point for a telecommunication network, and a procedure for providing telecommunication services.

The invention presumes the implementation of telecommunication services in accordance with the IN architecture (IN=Intelligent Network), for example, as described in the article "Intelligent Network", Nachrichtentechnik, Elektronik, Berlin 20, 1990, Pages 162 to 164.

A global service control point is connected to several service switching points via the no. 7 signaling network. The service control point provides central control of the implementation of one or several telecommunication services for the service switching points to which it is connected. The service switching points comprise the specially equipped switching points of a telecommunication network. In the event that one of these switching points receives a special connection request from a subscriber of the telecommunication network, a service switching function that is integrated in the switching point is triggered, which results in a service request message being sent to the global service control points. This service request message triggers the service logic assigned in the service control points, which in turn control the implementation of the telecommunication service, for example, by instructing the service switching point to transfer the connection request to another destination call number or by controlling a service support system which provides spoken announcements. The communication between the global service control points and the service switching points is carried out via the no. 7 signaling network.

SUMMARY OF THE INVENTION

The underlying task of the invention is to increase the capacity of the service provision.

This task is to be implemented by a service provisioning system for a telecommunication network comprising at least one global service control node for executing service control functions to one or more switching nodes each provided with a first control unit which is designed to execute service switching functions which are caused by connection requests from subscribers of the telecommunication network to send service request messages to service control functions which each control the provision of a telecommunication service for the respective subscriber, the global service control nodes being connected to the switching nodes via a long-range communication network wherein the service provisioning system further comprises one or more local service control nodes for executing service control functions, each of the local service control nodes being associated with a respective one of switching nodes and being connected to the associated switching node via a respective local communication mechanism, that the service control function associated with a service switching function is installed globally in one of the global service control nodes or locally in one of the local service control nodes depending on the respective telecommunications service being controlled by the service control function, and that each of the switching nodes further comprises a second control unit which is designed to determine for each service request message whether the associated service control function is installed locally or globally, and routes the service request message through the long-range communications network to a global service control node if the associated service control function is installed globally, and via the local communication mechanism to a local service control node associated with the respective switching node if the associated service control function is installed locally.

The above-mentioned task is further implemented using a switching point for a telecommunication network comprising a first communication with at least one global service control node over a long-range communications network, and a first control unit for executing service switching functions which are caused by connection requests from subscribers of the telecommunications network to send service request messages to service control functions which each control the execution of a telecommunications service for the respective subscriber, wherein the switching node further comprises a second communication unit for communication with at least one local service control node via a local communication mechanism, and a second control unit which is designed to determine for each of the service request messages whether the associated service control function is installed locally or globally, the service control function associated with a service switching function being installed locally or globally depending on the respective telecommunications service being controlled by the service control function, and that the second control unit is further designed to route the service request message by means of the first communication unit through the long-range communication network to a global service control node if the associated service control function is installed globally, and by means of the second communication unit via the local communication mechanism to a local service control node associated with the switching node if the associated service control function is installed locally.

The above-mentioned task is further implemented with a procedure for providing telecommunication services the method comprising, causing a service switching function executed by the controller of a switching node of the telecommunication network to send a service request message to a service control function in response to a connection request from a subscriber, whereupon the service control function controls the provision of the telecommunications service, wherein the controller determines for each service request message from the respective telecommunications service requested by the service message whether the service control function to be assigned to the service request message is installed globally or locally, that the controller sends the service request message over a long-range communications network to a global service control node via the long-range communications network if the service control function to be assigned is installed globally, and that the controller sends the service request message via a local communication mechanism to a local service control nodes associated with the switching node and communicates with the local service control node via the local communication mechanism if the service control function to be assigned is installed locally.

The underlying concept of the invention is to connect service switching points to assigned local service control points via a local communication mechanism in addition to connecting them to a global service control point, and to install the service logic for a service requested by a service switching point, either globally in global service control point or locally in the assigned local service control point depending on the type of service. For each service switching point, it is to be decided for which services the service control is to be transferred from the global to the assigned local service control point. For each service request of a service switching point, it is to be determined whether the requested service is currently to be controlled by a local or global service control point, and the communication with the service control points is controlled accordingly.

One of the advantages of the invention is a reduction in 'the average time and average expenditure in implementing a telecommunication service. A service control point that has been adapted to the service type can be used. The advantages of a global service control point (central service implementation, improved system utilization) are combined service-specifically with the advantages of a local service control point (faster communication connection). It is also possible to group special services with common resource utilization.

The invention also enables cost-efficient implementation, as existing service switching functions and service control functions can be reused in a service provisioning system in accordance with the invention.

In addition, the invention reduces the load on the signaling network.

Further advantages of the invention include the increased total number of services that can be implemented in parallel and the possibility for detailed service management.

Refer to the sub-claims for further advantageous features of the invention.

Here, it is of particular benefit to dynamically change the assignment of the service controllers to local or global service control points depending on the system parameters of the telecommunication network. This enables an optimum adaptation of the implementation of service control functions to suit the current system status.

BRIEF DESCRIPTION OF THE DRAWING

The following pages provide an explanation of the invention using several implementation examples and supporting drawings.

DETAILED DESCRIPTION OF THE INVENTION

Figure 1:
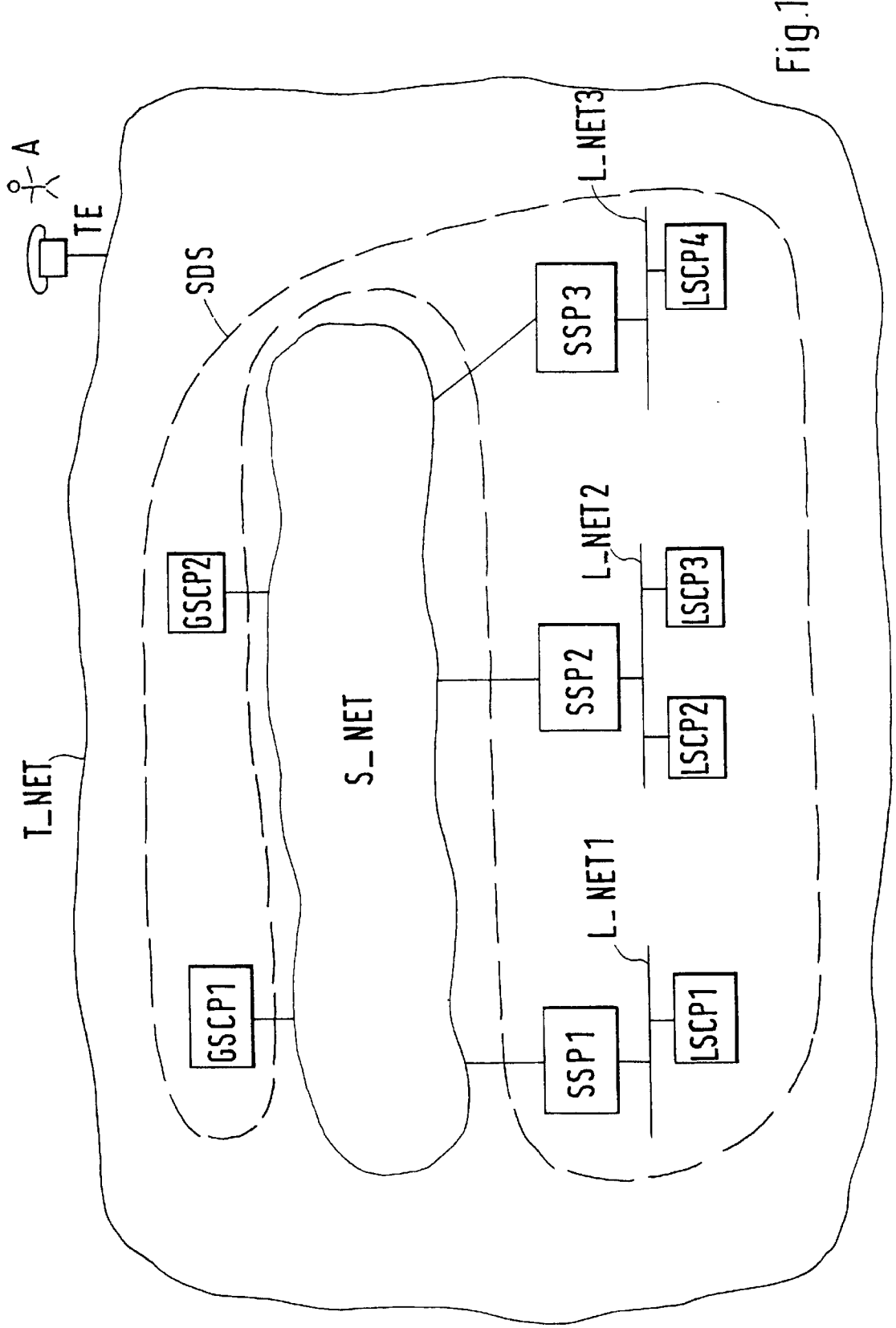
FIG. 1 Shows a block diagram of an invention-oriented service provisioning system featuring several invention-oriented switching points.

FIG. 1 shows a T_NET telecommunication network with which a TE terminal of a subscriber A is connected. The T_NET telecommunication network exhibits an S_NET signaling network and SDS service provisioning system, which, for its part, exhibits several specially equipped service switching points SSP1 to SSP3, several global service control points GSCP1 to GSCP2, several local service control points LSCP1 to LSCP4, and several local communication networks L_NET1 to L_NET3.

In addition to service switching points SSP1 to SSP3, the T_NET telecommunication network exhibits various other switching points. Here, it is of course also possible that these switching points are assigned to various network operators.

Each of the service switching points SSP1 to SSP3 is connected to the S_NET signaling network and the local communication networks L_NET1, L_NET2 and/or L_NET3, with which the local control points LSCP1, LSCP2 and LSCP3 and/or LSCP4 are also connected.

The number of service switching points SSP1 to SSP3 and global service control points GSCP1 to GSCP2 has been selected by way of example, but at least one service switching point and one global service control point will always be connected to the S_NET signaling network. Luckily, the local service control points LSCP1 to LSCP4 are located very near to the assigned local service switching point SSP1, SSP2 and/or SSP3, and may, for example, form different components of the same switching point (switching point in terms of area).

The S_NET signaling network is formed by a no. 7 signaling network. It is also possible that the global service control points GSCP1 and GSCP2 are connected to the service switching points SSP1 to SSP3 via a different wide area communication network, for example, via ATM or DQDB data networks (ATM=Asynchronous Transfer Mode, DQDB=Distributed Queue Dual Bus).

The local service control points LSCP1 to LSCP4 control the implementation of a first group of telecommunication services for the service switching points SSP1, SSP2 and/or SSP3 to which they are connected. The global service control groups GSCP1 to GSCP2 control the implementation of a second group of telecommunication services centrally for all service switching points SSP1 to SSP3. Depending on the type of telecommunication service, the service logic is installed either locally or globally, whereby the installation may be different from switching point to switching point. For each service request, it is established in the switching point whether the control of the requested service is currently installed locally or globally, and the service request is fed accordingly.

It is advantageous to always install the service control functions globally for all services, and only install the service control for the respective switching points locally in the following circumstances:

The service control functions for telecommunications services that need to be implemented frequently by a switching point are to be installed locally for this switching point.

The service control functions for subscriber-specific services are to be installed locally. Subscriber-specific services comprise services which are more closely linked to the subscribers served by a switching point and, for example, therefore require access to subscriber-specific data in order to perform the service, or which are not or are only seldom requested by other switching points. Examples of these services include: "Virtual Private Network" services, "Number Portability" services, "Flexible Tariffing" services, "Subscriber Screening" services.

Due to the fact that the data required by such services often overlaps, it is beneficial for their service control functions to use a common database. A further advantage can be achieved by enabling their access to the subscriber database of the assigned switching point.

The service control functions for services requiring special data in order to perform the service, which is also stored in a switching point, are to be installed locally for this switching point. However, this is only advantageous when the local service control points can access this data of the switching point.

Figure 2:
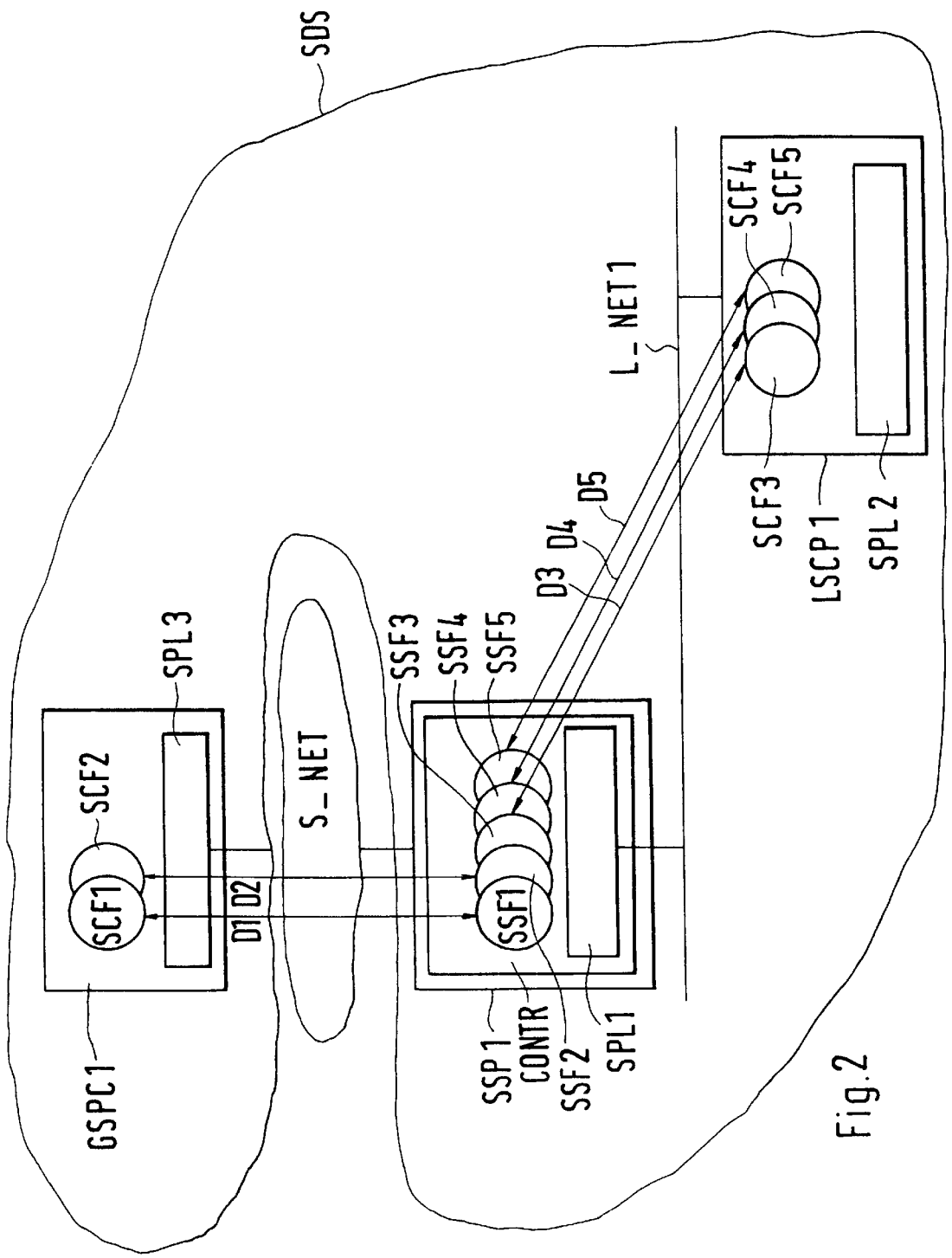
FIG. 2 Shows a block diagram of a section from the service provisioning system in accordance with FIG. 1.

The following sections explain the structure of specially designed service switching points SSP1 to SSP3, the service control points GSCP1 to GSCP2 and LSCP1 to LSCP3 and the communication networks L_NET1 to L_NET3 using the example of FIG. 2

FIG. 2 shows the S_NET signaling network, the SDS service provisioning system with the service control points GSCP1 and LSCP1, and the local communication network L_NET1.

The service switching point SSP1 comprises a wide area switching point, for example, the switching point Alcatel 1000S12. It is of course also possible that the service switching point SSP1 comprises a switching point which, in addition to wide area connections, also switches videophone images and/or data connections.

The service switching point SSP1 is equipped with connecting modules for the connection of subscriber connecting lines and/or connecting lines to other switching points of the T_NET telecommunications network, via a switching network for switching connections between the connecting modules, and a controller CONTR which, amongst other things, controls the setup of connections and signalling with subscribers and other switching points. It is also possible that the connecting modules serve the connection of mobile subscribers. In this implementation example, the only difference from the components of the switching point is the controller CONTR from the corresponding components of a conventional switching point. The controller CONTR is based on a computing system with corresponding peripheral modules, which is set up from a powerful central computer or from several individual computers linked via an internal communication network. In this computing system, an operating system platform is set up followed by control programs which control the functions of the service switching point SSP. The operating system platform is advantageously based upon a real time operating system that is designed to meet the requirements of a switching point. Together, the computing system and operating system platform form a SPL1 system platform for the control programs set up here. Five of the functions (SSF1 to SSF5) performed by these control programs are shown in FIG. 2.

The functions SSF1 to SSF5 represent service switching functions. Each of these functions monitors the connection request of subscribers of the T_NET telecommunication network who are fed via the service switching point SSP. In the event that a special connection request is recognized, which is required for the implementation of a telecommunication service, the function will communicate with the service control function assigned to this telecommunication service. The criteria for a special connection request could, for example, be the call number of the called subscriber entered in the connection request or that of the calling subscriber who sent the request. In addition, these functions serve to execute the instruction of the service control function, transfer the connection request to another destination subscriber, for example, or set up a usable channel to the calling subscriber.

The service control points LSCP1 and GSCP1 each exhibit a system platform SPL2 and/or SPL3 which are both formed by one or several connected computers and one or several operating systems set up here. The operating system may comprise a UNIX operating system on which a middelware that is adapted to the special function of the service control points LSCP1 and LSCP2, for example the Alcatel Nectar Telecom Middelware. FIG. 2 shows only three of the functions (SCF3 to SCF5 and/or SCF1 to SCF2) of the control programs set up on the operating platforms SPL2 and SPL3.

The functions SCF1 to SCF5 represent service control functions for various telecommunication services. Triggered by a service request message from a service switching function, they control the implementation of the respective telecommunication service. In this case, the functions SCF1 to SCCF5 control the implementation of the telecommunication service in accordance with the service logic program installed for the respective service in service control point GSCP1 and/or LSCP1.

The local communication network L_NET1 is made up of one or even several LAN(s) (Local Area Network). Examples of LANs include Ethernet, Fast-Ethernet, Token-Ring and FDDI networks. It is also possible that the local control point LSCP1 is integrated in the controller of service switching point SSP1 and that its functions are performed on its system platform SPL1. In this case, the local communication network L_NET1 is no longer required.

The subscriber A uses his terminal TE to send a connection request to the T_NET telecommunication network. The connection request is transferred through the T_NET telecommunication network to the service switching point SSP1. The function SSF1 recognizes that a first telecommunication service is to be performed for this connection request. For the service request messages subsequently sent by the function SSF1, it is then established whether requested service is installed locally or globally. The service, and thus the service control functions performed for controlling of the implementation of the service, are installed globally, which results in the service request message being transferred to the service control function GSCP1 via the S_NET signaling network. The service request message triggers the function SCF1, which then controls the implementation of the telecommunication service in a dialog D1. Parallel to function SSF1, the functions SSF2 to SSF5 of connection requests from other subscribers are triggered, causing service request messages to be sent which request various second, third, fourth and/or fifth services. The second service is installed globally, and the third to fifth services locally, which means that service request messages are transferred to the global service control point LSCP1 accordingly. The service request messages trigger the service control functions SCF2 to SCF5, which in turn control the implementation of the requested service in a dialog D2, D3, D4 and/or D5. The dialogs D1 to D5 comprise the exchange of DNAP messages (INAP=Intelligent Network Applications Protocol). For the functions SSF1 to SSF5 themselves, the global or local installation of the assigned service control functions SCP1 to SCP5 is transparent.

Figure 3:
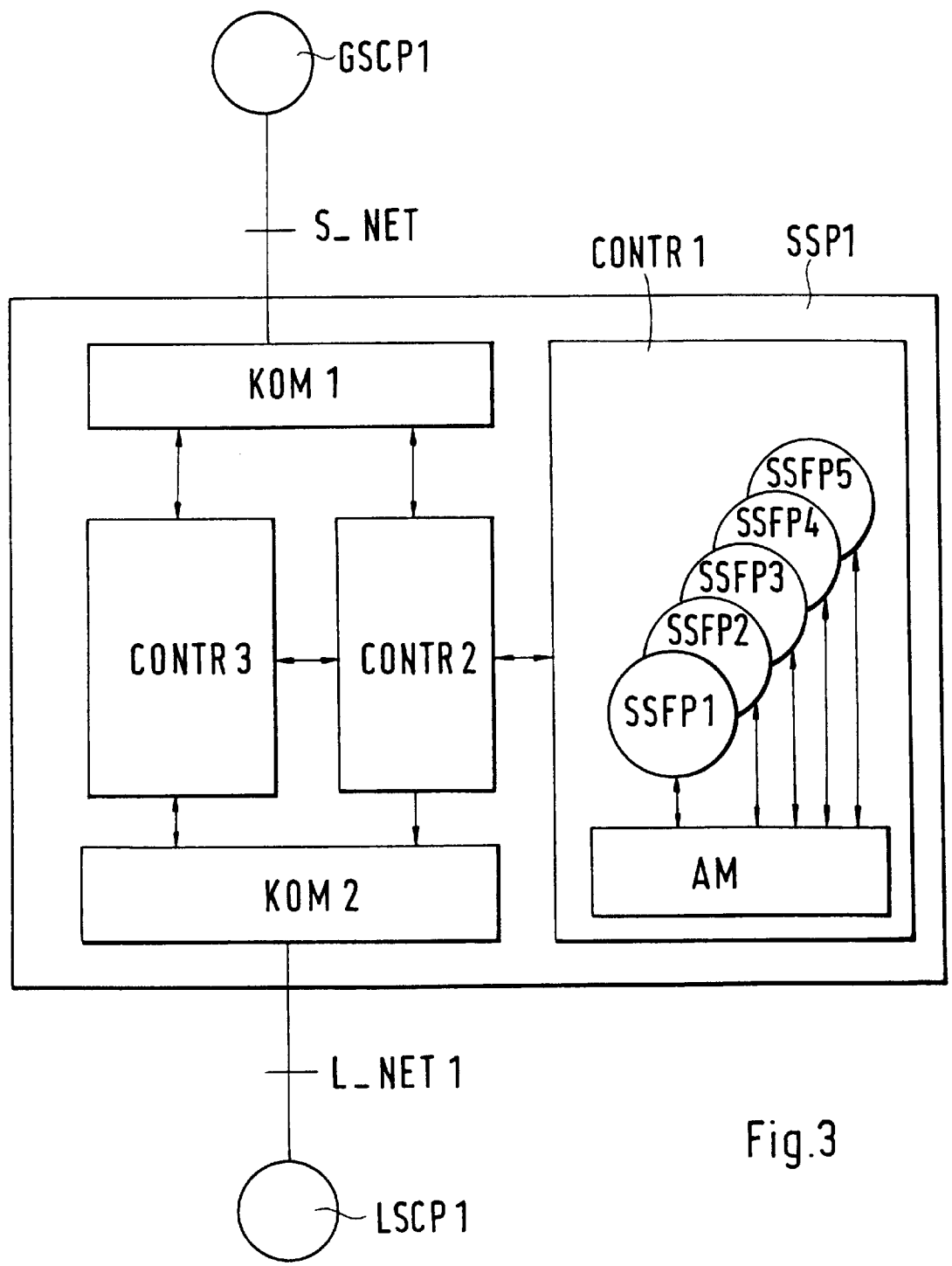
FIG. 3 Shows a functional representation of an invention-oriented switching point in accordance with FIG. 1.

The example provided in FIG. 3 provides clarification of the functional structure of the service switching point SSP1.

FIG. 3 shows the global service control point GSCP1, the local service control point LSCP1 and the connected service switching point SSP1 with two communication units KOM1 and KOM2 and three control units CONTR1 to CONTR3.

The control unit CONTRL performs the service switching functions executed by the controller CONTR.

It exhibits one processing unit AM and several service switching function processes SSFP1 to SSFP5.

The service switching function processes SSSP1 to SSFP5 represent the procedure of a service switching function. This procedure is performed by the controller CONTR. The processing unit AM coordinates and controls the working of these processes. In order to perform the service, the service switching function processes SSFP1 to SSFP5 communicate with service-specific service control processes in the service control points GSCP1 or LSCP1, which represent the implementation of a service logic program within the framework of performing the service control function. In this case, the service control functions and service switching functions interact by means of the INAP (INAP=Intelligent Network Applications Protocol) using the service switching functions and service control functions in accordance with the IN architecture. The IN application messages (INAP messages) exchanged within the framework of this protocol, as well as underlying services and action of this protocol, are explained in the ITU-T Q. 1219 recommendation, Chapter 6.5, Intelligent Networks Application Protocol, Pages 26 to 40, and in more detail in the ITU-T Q. 1219 recommendation for IN CS-1. The switching function processes SSFP1 to SSFP5 advantageously also represent service switching functions in accordance with the IN architecture.

The control unit CONTR2 establishes for each service request message which is directed at a service control function by one of the service switching functions performed by the control unit CONTR1, whether the service control function assigned to the requested service is installed locally or globally. If it is installed globally, it accesses the communication unit KOM1 in order to transfer the service request messages to a global service control point via the S_NET signaling network. If this is not the case, it accesses the communication unit KOM2 in order to transfer the messages to a local service control point via the local communication network. The messages exchanged between other service switching functions and service control functions in performing a service requested by a service request message are diverted by the control unit CONTR2 in accordance with this service request message.

A first possibility for implementing this function is provided by the fact that the address of a global service control point is already entered in the service request and subsequent messages. This global service control point normally performs the service control function for the requested service. The control unit CONTR2 accesses a database in which it is noted which services in which global service control points for the service switching functions of the service switching point SSP1 have been transferred from a global to a local installation. If the service request message is directed at such a service of such a service control point, the service request messages and the messages assigned to the subsequent dialog are diverted to the local service control point LSCP1. Otherwise, the service request message and the message assigned to the subsequent dialog are transferred unchanged to the addressed global service control point. It is also possible that the cases in which a diversion to the service control point LSCP1 is necessary can only be identified with the aid of the requested service.

A second possibility for implementing this function is that a service control point is not yet localized in the service request message for the implementation of the service control function. The control unit CONTR2 now accesses a database in which it is specified (implicitly also) for all services which can be requested by the service switching functions of the service switching point SSP1 to which the assigned service control point is addressed whether this service control point involves a local or a global service control point. If a local service control point is identified in this way, a communication unit KOM2 is accessed in order to transfer the service request message and messages assigned to the subsequent dialog to the addressed local service control point LSCP1. Otherwise, a communication unit KOM1 is accessed in order to transfer the messages to the addressed global service control point. The addressing of the service control point and control of the respective transport protocol layers is thus performed independently by the control unit CONTR2 by means of accessing the communication units KOM1 and KOM2.

It is also possible that in this case, several global service control points and/or local service control points are entered for a service in the database and the control unit CONTR2 dynamically selects one of these service control points, taking into consideration an even load distribution, for example.

The database which is accessed by the control unit CONTR2 comprises a database of the service switching point SSP1. It is also possible that this database comprises a central database such as a service management facility.

The communication unit KOM1 provides the protocol processing units for transmission and receiving side handling of the transport of INAP messages (INAP=Intelligent Network Application Part) via the signaling network no. 7 and the respective physical connecting modules. Here, the INAP messages are transported by means of the TCAP protocol (TCAP=Transport Capabilities Application Part) which sets up on the SCCP protocol (SCCP=Signaling Connection Control Part) and the MTP protocol (MTP=Message Transfer Part).

The communication unit KOM2 provides the hardware and software function groups for the transport of INAP messages (INAP=Intelligent Network Application Part) via the local communication network L_NET1.

For this purpose, the communication unit KOM2 is equipped with a protocol processing unit for transmission and receiving side handling of the TCAP protocol of the no. 7 ITU-T signaling system (TCAP=Transport Capabilities Application Part). This protocol processing unit sets up via an adaptation unit on a protocol processing unit which provides the service of transporting messages using a LAN protocol via the local communication network L_NET1. To this end, the protocol processing unit processes, for example, a protocol stack involving a TCP/IP protocol (IP=Internet Protocol, TCP=Transport Control Protocol) which sets up on a LAN MAC protocol (MAC=Medium Access Layer).

It is also possible that the communication unit KOM2 transports INAP messages to the local service control point LSCP1 via a inter-process mechanism, for example, in accordance with the CORBA architecture (CORBA= Common Object Request Broker Architecture).

It is possible that the TCAP protocol is processed by the control unit CONTR1. Other protocol layers may also be processed by the control unit CONTR1. In this case, the communication unit KOM2 contains corresponding "bridging" functions in order to convert the transport protocols into the respective LAN transport protocols.

The control unit CONTR3 controls the local or global installation of services for the service switching point SSP1. Using control signals, it arranges to download and activate the service logic for a special service in the local service control point LSCP1 and or to deactivate the service logic available in the local service control point. The download of the service logic can-be performed manually or online, for example, by means of a central server, and involves the storing of a large amount of service logic. It is also possible that the control unit uses the same procedure to control the download or deactivation of service logic in global service control points. If the control unit has changed the global or local installation of a service to this extent, the corresponding data is also changed in the database which is accessed by the control unit CONTR2 for the purpose of establishing the global or local installation of service control functions.

A further advantage is provided by the fact that the control unit CONTR3 monitors certain parameters of the T_NET telecommunication network and, by evaluating these parameters, decides on the local or global installation of the services for the service switching point SSP1. This decision can be made when installing a service for the first time or dynamically in ongoing operation if parameters are changed. This kind of parameter may, for example, comprise a specification of how often per time unit the implementation of a telecommunication service is requested by the service switching point SSP1. If this value exceeds a certain threshold, the service will be installed locally. The installation changeover can also be configured to depend on the following parameters: Load of central service control point, load of local service control point, load of signaling network, requested service quality for subscribers, etc.

In the same way, a decision can be made about the local or global installation of subscriber-specific services or services which can use the data of the service switching point SSP1 when performing the service. In this case, the installation changeover can be configured to depend on the following parameters: Frequency of requests for the services in the service switching point SSP1, number of services that are already installed locally and which access some or all of the same data, load of the central service control point, load of the signaling network, requested service quality for subscribers, etc.

It is also possible that the control unit CONTR3 comprises part of a central facility, for example, part of a service management facility or network management facility.

It is of course possible to do without the control unit CONTR3.

What is claimed is:

1. A service provisioning system (SDS) for a telecommunication network (T_NET), comprising:
    at least one global service control node (GSCP1, GSCP2) for executing service control functions; and
    one or more switching nodes (SSP1 to SSP3) each provided with a first control unit (CONTR1) which is designed to execute service switching functions which are caused by connection requests from subscribers (A) of the telecommunication network (T_NET) to send service request messages to service control functions which each control the provision of a telecommunication service for the respective subscriber;
    wherein the global service control nodes (GSCP1, GSCP2) are connected to the switching nodes (SSP1 to SSP3) via a long-range communications network (S_NET),
    wherein the service provisioning system (SDS) further comprises:
        one or more local service control nodes (LSCP1 to LSCP4) for executing service control functions,
        wherein each of the local service control nodes (LSCP1 to LSCP4) being associated with a respective ones of the switching nodes (SSP1 to SSP3) and being connected to the associated switching node (SSP1 to SSP3) via a respective local communication mechanism (L_NET1 to L_NET3);
        wherein the service control function (SCF1 to SCF5) associated with a service switching function (SSF1 to SSF5) is installed globally in one of the global service control nodes (GSCP1) or locally in one of the local service control nodes (LSCP1) depending on the respective telecommunications service being controlled by the service control function (SCF1 to SCF5); and
        wherein each of the switching nodes (SSP1 to SSP3) further comprises:
            a second control unit (CONTR2) which is designed to determine for each service request message whether the associated service control function is installed locally or globally, and routes the service request message:
                through the long-range communications network (S_NET) to a global service control node (GSCP1) if the associated service control function (SCF1, SCF2) is installed globally, and
                via the local communication mechanism (L_NET1) to a local service control node (LSCP1) associated with the respective switching node (SSP1) if the associated service control function (SCF3 to SCF5) is installed locally.

2. A service provisioning system (SDS) as claimed in claim 1, wherein service control functions for subscriber specific services are installed locally.

3. A service provisioning system (SDS) as claimed in claim 1, whererin service control functions for services which require data stored in a switching node for their provision are installed locally.

4. A service provisioning system (SDS) as claimed in claim 1, wherein service control functions for services which are frequently requested by a switching node are installed locally for said switching node.

5. A service provisioning system (SDS) as claimed in claim 1, further comprising:
    a third control unit (CONTR3) which is designed to control the global or local installation service control functions for service switching functions.

6. A service provisioning system (SDS) as claimed in claim 5, wherein the third control unit (CONTR3) is further designed to dynamically determine a global or local installation of service control functions based on parameters of the telecommunications network (T_NET).

7. A service provisioning system (SDS) as claimed in claim 1, wherein the local communication mechanism is an interprocess communication mechanism.

8. A service provisioning system (SDS) as claimed in claim 1, wherein the local communication mechanism (L_NET1 to L_NET3) is a connection through a LAN.

9. A service provisioning system (SDS) as claimed in claim 1, wherein the first control unit (CONTR1) and the local and global service control nodes (GSCP1 to GSCP2, LSCP1 to LSCP4) are so designed that the service switching functions interact with the locally installed service control functions and the globally installed service functions through INAP messages in the same manner and require no knowledge of the local or global installation of service control functions.

10. A switching node (SSP1) for a telecommunication network (T_NET), comprising:
    a first communication unit (KOM1) for communication with at least one global service control node (GSCP1) over a long-range communications network (S_NET); and
    a first control unit (CONTR1) for executing service switching functions (SSF1 to SSF5) which are caused by connection request from subscribers (A) of the telecommunications network (T_NET) to send request service request messages to service control functions, wherein each control the execution of a telecommunications service for the respective subscriber,
    wherein the switching node (SSP1) further comprises:
        a second communication unit (KOM2) for communication with at least one local service control node (SSP1) via a local communication mechanism (L_NET1), and a second control unit (CONTR2) which is designed to determine for each of the service request messages whether the associated service control function is installed locally or globally;

wherein the service control function (SCF1 to SCF5) associated with a service switching function (SSF1 to SSF5) being installed locally or globally depending on the respective telecommunications service being controlled by the service control function (SCF1 to SCF5);

wherein the second control unit (CONTR2) is further designed to route the service request message:

by means of the first communication unit (KOM1) through the long-range communications network (S_NET) to a global service control node (GSCP1) if the associated service control function (SCF1, SCF2) is installed globally, and by means of the second communication unit (KOM2) via the local communication mechanism (L_NET1) to a local service control node (LSCP1) associated with the switching node if the associated service control function (SCF3 to SCF5) is installed locally.

11. A method for providing telecommunication services to subscribers (A) of a communications network (T_NET), comprising:

sending a service request message to a service control function in response to a connection request from a subscriber (A), whereupon the service control function controls the provision of the telecommunication service, determining for each service request message from the respective telecommunication service requested by the service request message whether the service control function to be assigned to the service request message is installed globally or locally, sending the service request message over a long-range communications network (S_NET) to a global service control node (GSCP1), and communicating with the global service control node (GSCP1) via the long range communications network (S_NET) if the service control function (SCF1, SCF2) to be assigned is installed globally, and sending the service request message via a local communication mechanism (L_NET1) to a local service control node (LSCP1) associated with the switching node (SSP1) and communicating with the local service control node (LSCP1) via the local communication mechanism (L_NET1 to L_NET3) if the service control function (SCF3 to SCF5) to be assigned is installed locally.

* * * * *